US006961938B1

(12) United States Patent
Carwile et al.

(10) Patent No.: US 6,961,938 B1
(45) Date of Patent: Nov. 1, 2005

(54) MANAGEMENT OF MULTIPLE NETWORK DEVICES USING UNSIGNED JAVA APPLETS

(75) Inventors: Alan D. Carwile, Los Gatos, CA (US); Shannon L. Kohl, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 662 days.

(21) Appl. No.: 09/892,322

(22) Filed: Jun. 26, 2001

Related U.S. Application Data

(60) Provisional application No. 60/273,009, filed on Mar. 3, 2001.

(51) Int. Cl.[7] ............................................ G06F 15/163
(52) U.S. Cl. ...................................... 719/310; 715/765
(58) Field of Search ......................... 719/310; 715/765

(56) References Cited

U.S. PATENT DOCUMENTS 5,922,044 A * 7/1999 Banthia ...................... 709/203
6,108,687 A * 8/2000 Craig ......................... 709/203
6,317,143 B1 * 11/2001 Wugofski ................... 345/765
6,325,547 B1 * 12/2001 Cammons et al. ............ 385/76

* cited by examiner

*Primary Examiner*—Meng-Al T. An
*Assistant Examiner*—LeChi Truong
(74) *Attorney, Agent, or Firm*—Wong, Cabello, Lutsch, Rutherford & Brucculeri, LLP

(57) ABSTRACT

Remote management of a plurality of network devices is described wherein each device is managed with its own unsigned Java™ applet. Unsigned applets launched from different devices operate within the same shared environment of a webpage. Furthermore, a transmitting applet communicates with a recipient applet. In one embodiment, the recipient applet is a central management applet that combines data from a plurality of devices into one data pool, which can then be used to provide higher level management capabilities. A combination of centralized management and distributed management is allowed within the Java security model, without having to resort to signed Java applets or Java applications.

6 Claims, 8 Drawing Sheets

FIG. 5

MANAGEMENT OF MULTIPLE NETWORK DEVICES USING UNSIGNED JAVA APPLETS

CROSS-REFERENCE TO RELATED APPLICATION

This application claims priority under 35 U.S.C. 119(e) from U.S. provisional patent application 60/273,009 having a filing date of Mar. 3, 2001 which is entitled "Management of Multiple Network Devices Using Unsigned Java Applets," inventors Alan D. Carwile and Shannon L. Kohl, and which is hereby incorporated by reference.

INCORPORATION BY REFERENCE

U.S. patent application Ser. No. 09/239,463 entitled "System and Method for Managing Fibre Channel Switching Devices," inventors Wendy Y. Dorn, Paul Ramsay and Ezio Valdevit with a filing date of Jan. 28, 1999 is hereby incorporated by reference.

1. Field of the Invention

The present invention relates generally to systems and methods for managing devices over a network system. More particularly, the present invention relates to network management of devices using unsigned Java™ applets.

2. Description of the Related Art

One type of network technology is based on the Fibre Channel family of standards (developed by the American National Standards Institute (ANSI) which defines a high speed communications interface for the transfer of large amounts of data between a variety of hardware systems such as personal computers, workstations, mainframes, supercomputers, storage devices and servers. Thus, Fibre Channel is an alternative to conventional channel and network connectivity technologies and is used to deliver high speed and low latency connectivity among many clients.

Since the acceptance of the Fibre Channel interconnect in computing environments, switches are becoming the device of choice for storage and server interconnection. Just like within a network environment, such as a Local Area Network (LAN) or Wide Area Network (WAN), one or more fibre channel switches furnish the backbone for all connected devices in a Storage-Server Area Network (SAN).

One key issue in networking is the ability to manage the network system. The World Wide Web ("Web"), as well as other wide-area networks (WANs) provide a rapid, low cost communication mechanism for remotely managing network devices. Ideally, an effective network management system should allow use of WANs to further facilitate the network management process. Moreover, the introduction of Java has made it possible to distribute platform independent executable content over networks. Thus, an effective management system should also allow the use of Java to improve the network management process.

The Java applet security model prevents an applet from opening TCP/IP sockets on any system other than the one from which it was loaded. This means that in order to manage a set of networked devices in the security model, the data and functions to manage those devices must either be collected into each and every device or one device must contain the data and functions and be a "preferred" device from which is the only launch point for an applet. This would require the data and functions to manage the devices be collected into each and every device meaning that the devices must communicate this information to each other which takes away from the bandwidth available for data. Furthermore each device must provide the union of all functionality available for all the devices, even if the functionality is not available on that particular device. This presents issues of compatibility and interoperability as new features get added to some devices but are not backward compatible with older devices.

Another existing method would be to disable the Java "sandbox", in particular by using "signed" applets. Signed applets require the browser to recognize the certificate with which the applet is signed. These certificates generally expire after a year or two, and upon expiration, would cause the browser to prompt the user with a warning about the applet. The certificate must be signed by a well-known "trusted" authority. The signing schemes differ in each browser and require support of multiple ways of signing the applet.

Java applications are another alternative, but Java applications introduce issues of distribution, installation, platform porting, and again, trust. A network management system using Java applets to provide distributed management that can be embedded in the network device, and management of multiple devices without signed applets or Java applications is highly desirable.

SUMMARY OF INVENTION

The present invention provides for remotely managing a plurality of network devices using a plurality of unsigned applets, including device applets, launched from different devices wherein each device is managed with its own device Java applet launched from its device, each unsigned applet being capable of communicating with another unsigned applet within the same shared environment. An example of a shared environment is a webpage. Various aspects of the invention may be embodied in various forms, for example as a system, a method, an apparatus or a computer usable medium.

A network device is any type of device requiring remote management over a network, examples of which include a local area network (LAN), a wide area network (WAN) such as the World Wide Web, or a storage area network (SAN). In one embodiment, the device is a fibre channel switch in a fabric of switches included in a network.

The present invention enables a user to perform administrative functions with respect to the network device. For example, for a fibre channel switch, a display allows a user to view the fabric topology, individual port and total switch traffic, and retrieved information about the switch status. Based on the information, the user can initiate commands to configure the switch and ports of the switch remotely.

In one embodiment of a system in accordance with the present invention, the system is initialized by a user designating a launch device from among the plurality of devices. A Java-capable browser requests a webpage from a server on the launch device. The browser loads the webpage comprising an unsigned central management applet and requests to each device server on each of the plurality of network devices for an unsigned device applet. Each applet loaded from the devices in the network contains the ability to manage that device and only that device, as well as the ability to communicate with one or more other unsigned applets. Therefore less communication bandwidth between the switches is consumed for network management purposes and more bandwidth is available for data.

In this embodiment, each device applet communicates with, or in other words is communicatively coupled to, the central management applet, here called a fabric view applet, within the same webpage. Each device applet serves as a proxy which communicates data to the fabric view applet. The fabric view applet combines the data from a plurality of devices into one data pool, which can then be used to provide higher level management capabilities. This invention allows a combination of centralized management and distributed management within the Java security model, without having to resort to signed Java applets or Java applications.

In one embodiment of the invention, in a system for remotely managing a plurality of network devices wherein each device is managed with a respective unsigned device applet launched from its device, an apparatus comprises a plurality of unsigned applets, comprising a device applet, operating within the same shared environment. The plurality of applets includes an unsigned transmitting applet and an unsigned recipient applet that have been launched from different devices and are communicatively coupled in the same shared environment.

Each recipient applet that will receive information comprises one or more model objects, of a non-graphical user interface (non-GUI) class, and a model adapter object, of a graphical user interface (GUI) class, associated with the model object. An example of a GUI class object is a container class object. The model adapter object unpacks information represented as one or more graphical user interface objects into a form usable by the model object. In one embodiment, the model adapter object comprises one or more methods that are overloaded to extract data received as GUI objects, rather than processing the data for display. The model adapter object forwards the data to the respective model object.

In one aspect of the invention, each transmitting applet that will transmit information comprises an initialization controller for obtaining a reference to the recipient applet with which it desires to communicate within the same shared environment. Furthermore, the initialization controller obtains a reference to the desired model adapter object using the reference to the recipient or desired applet. The initialization controller may store these references in memory accessible by the transmitting applet. The transmitting applet further comprises a data handler in each device applet for requesting device information from its corresponding device. Upon receipt of the information, the data handler forwards the data to the appropriate model object. The model object compares the newly arrived information with the currently stored information. If the information is new, a view object is notified and the display is updated if that information is needed for the display currently selected by the user.

Furthermore, the data handler is notified of the change. The data handler represents the new information as one or more GUI class objects, for example a container class object. Then, using the reference obtained during initialization, the data handler provides the model adapter object of the recipient applet with access to the GUI object.

In this manner, communication occurs between unsigned applets while still maintaining the Java security model.

BRIEF DESCRIPTION OF THE FIGURES

The figures depict one or more embodiments of the present invention for purposes of illustration only. One skilled in the art will readily recognize from the following discussion that alternative embodiments of the structures and methods illustrated herein may be employed without departing from the principles of the invention.

FIG. 5 illustrates an example of a user interface displaying device information for a switching device in accordance with the present invention.

DETAILED DESCRIPTION

Figure 1A:
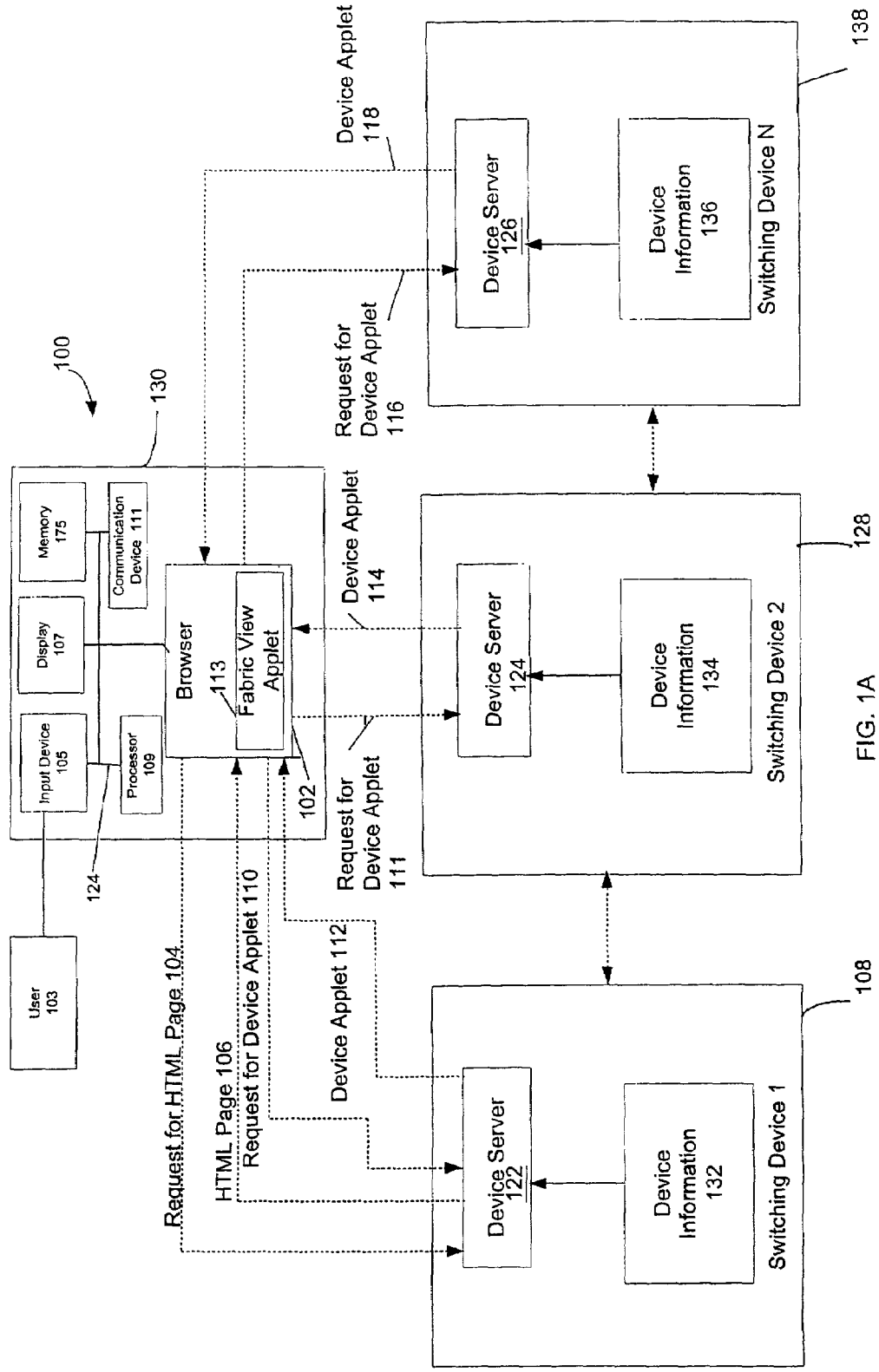
FIG. 1A illustrates an embodiment of a computer network system for remotely managing a plurality of network devices in accordance with the present invention.

The system 100 in FIG. 1A is an embodiment of a computer network system for remotely managing a plurality of network devices.

System 100 comprises a client computer 130 in communication with a plurality of network devices 108, 128, 138 over a network such as the Internet, the World Wide Web or any other network using a socket based protocol.

Client computer 130 may be embodied as a workstation or a personal computer which is readily accessed by a user 103. Client 130 preferably comprises a processor 109, a communications device 111, a memory 175, an input device 105, a display 107, and a browser 102 all interconnected via a bus 124. Communication device 111 provides the communication port through which browser 102 sends and receives information and requests. Examples of a communication device include modems and network adapters. Input device 105 may be any type of conventional input or pointing device, for example a keyboard, tablet, touch screen, and or a mouse. Input device 105 is used to transmit user commands from user 103 to the processor 109 for processing. Memory 175 includes random access memory (e.g. 128 MB). Memory 175 is used to store application programs, operations systems, and/or data. Display 107 is used to display texts, graphics, or video to user 103 and can be any conventional display device. Browser 102 is any software program for accessing, interacting with, and observing information in a network using socket-based protocols. For example, browser 102 can access, interact with, and observe information in the World Wide Web. Browser 102 is preferably a Java-enabled or Java-capable browser. In this embodiment the Java capable browser supports the Abstract Window Toolkit (AWT) which is a class library that contains a number of common graphical widgets.

Processor 109, communications device 111, memory 175, input device 105, display 107 and browser 102 are all conventional parts commercially available.

In this embodiment, the devices are fibre channel switching devices in a fabric of switches included in a network. Like the other switches in this embodiment, switching device 1 108 has a device server 122 which communicates information to the Java-capable browser 102 of the client computer 130. Each device server communicates device information 132, 134, 136 about its respective switch. Device information includes but is not limited to information regarding status, identification, environmental factors such as temperature, paths available within the network, device operating parameters, and events concerning the switch.

In one embodiment, a user 103 initiates the management system by designating a launch device by inputting via input device 105 a Uniform Resource Locator (URL) that is associated with the device in the browser 102. Any device in the system can act as a launch device. In this embodiment, the browser 102 initiates a request 104 for a webpage written in an applet compatible language such as a markup language, for example HyperText Markup Language (HTML). Upon the request, the launch device, in this embodiment switch or switching device 1, polls the network of devices to see which devices are in the network and receives identifying information from each device. Switch 1's device server 122 then sends 106 the requested page which comprises an unsigned fabric view applet 113 and requests 110, 111 and 116 for device applets, to be sent to each of the device servers for its respective unsigned device applet 112, 114 and 118. The browser requests each applet which each device server sends. Each device applet executes to display a graphical representation of each switch's device information on display 107 as selected by the user 103.

Figure 1B:
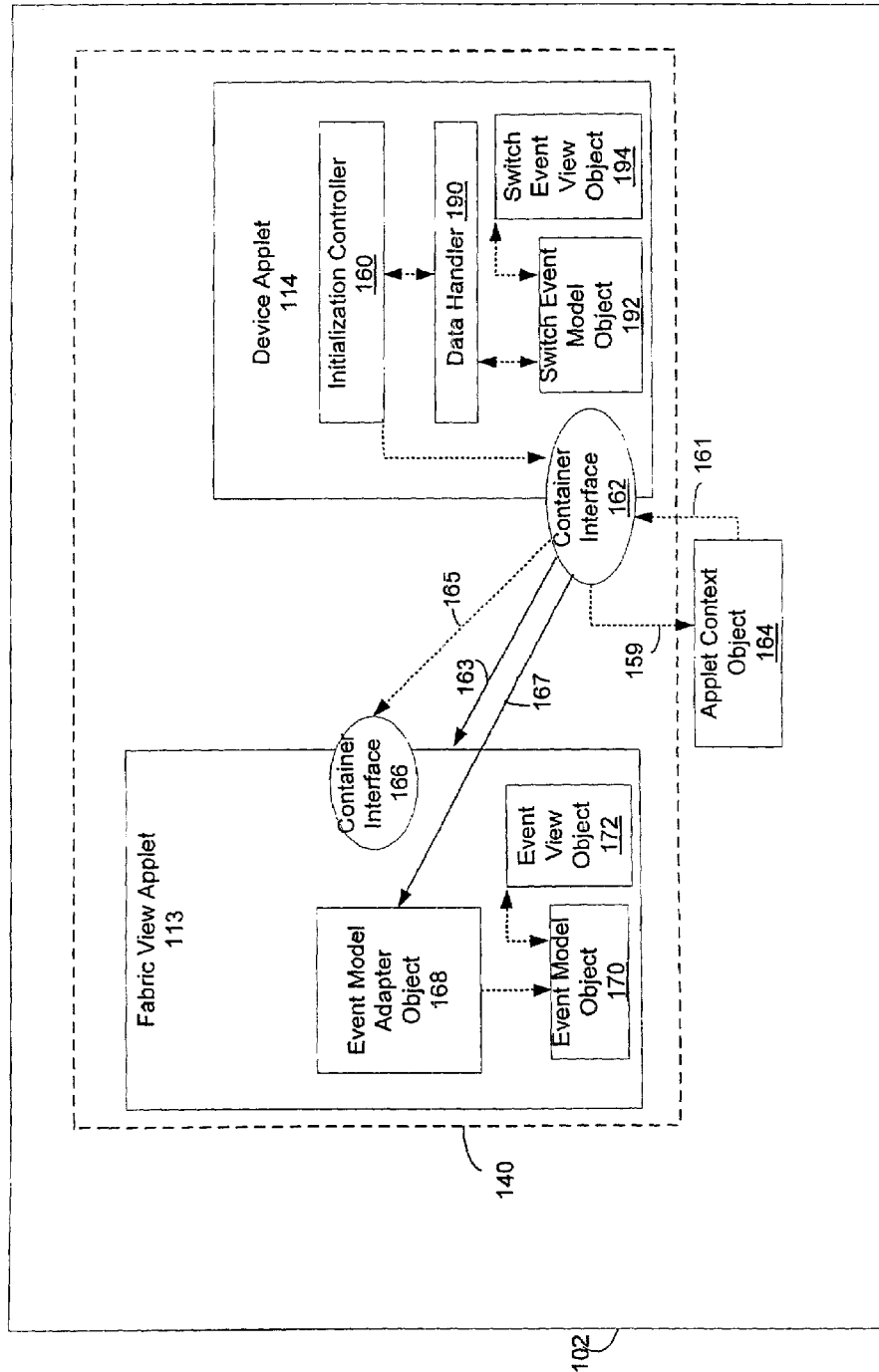
FIG. 1B illustrates an embodiment of an apparatus in which unsigned applets are initialized to communicate with each other in accordance with the present invention.

FIG. 1B illustrates an embodiment of an apparatus in which unsigned applets are initialized to communicate with each other in the same shared environment in accordance with the present invention.

In this embodiment, the shared environment is webpage 140. Within webpage 140, unsigned fabric view applet 113 operates as does unsigned device applet 114. Each of these applets have been launched from different servers.

Fabric view applet 113, which is first loaded by the browser in this embodiment comprises a container interface 166, an example of a non-GUI class model object called event model object 170, an example of a GUI class model adapter object called event model adapter object 168 that communicates with the event model object, and an example of a view object called event view object 172.

A model object compares newly transmitted data with the most recently stored data and determines whether or not there has been a change in the new data. In this embodiment, the event model object 170 processes data for fabric events based on events in all the switches in the fabric.

If the model object detects a change in the new device data, a signal is transmitted to a view object which is responsible for graphically displaying the new data or information based on it on display 107. Here, an event view object 172 is responsible for graphically displaying information regarding fabric events based on the new data in the event model object 170.

If an applet is to be communicated with, it will comprise a model adapter object of a GUI class, such as the Java container class. The model adapter object has one or more methods that are overloaded to extract the data represented as one or more GUI class objects for use by non-GUI class model objects, rather than to do the normal processing of adding them for display to the user interface. Here, the event model adapter object 168 will extract events data.

A Java capable browser instantiates an object of the class AppletContext. The AppletContext class comprises a method called getApplets( ) which when called returns a list of references to all the applets, currently present in the shared environment, which in this embodiment is a webpage 140. An address location or a pointer would be examples of a reference.

Device applet 114 comprises an initialization controller 160, which is program controlled logic, for example software, for obtaining the references to fabric view applet 113 and one or more model adapter objects therein including the event model adapter 168. The initialization controller will store these references for later use by the device applet.

If the device applets are to communicate device information with each other, they would each have appropriate model adapter objects to be referenced by the other device applets also.

The device applet 114 further comprises a data handler 190 which is embodied as software for processing the device information received from device server 124, switch event model object 192, switch event view object 194, and container interface 162.

Figure 1C:
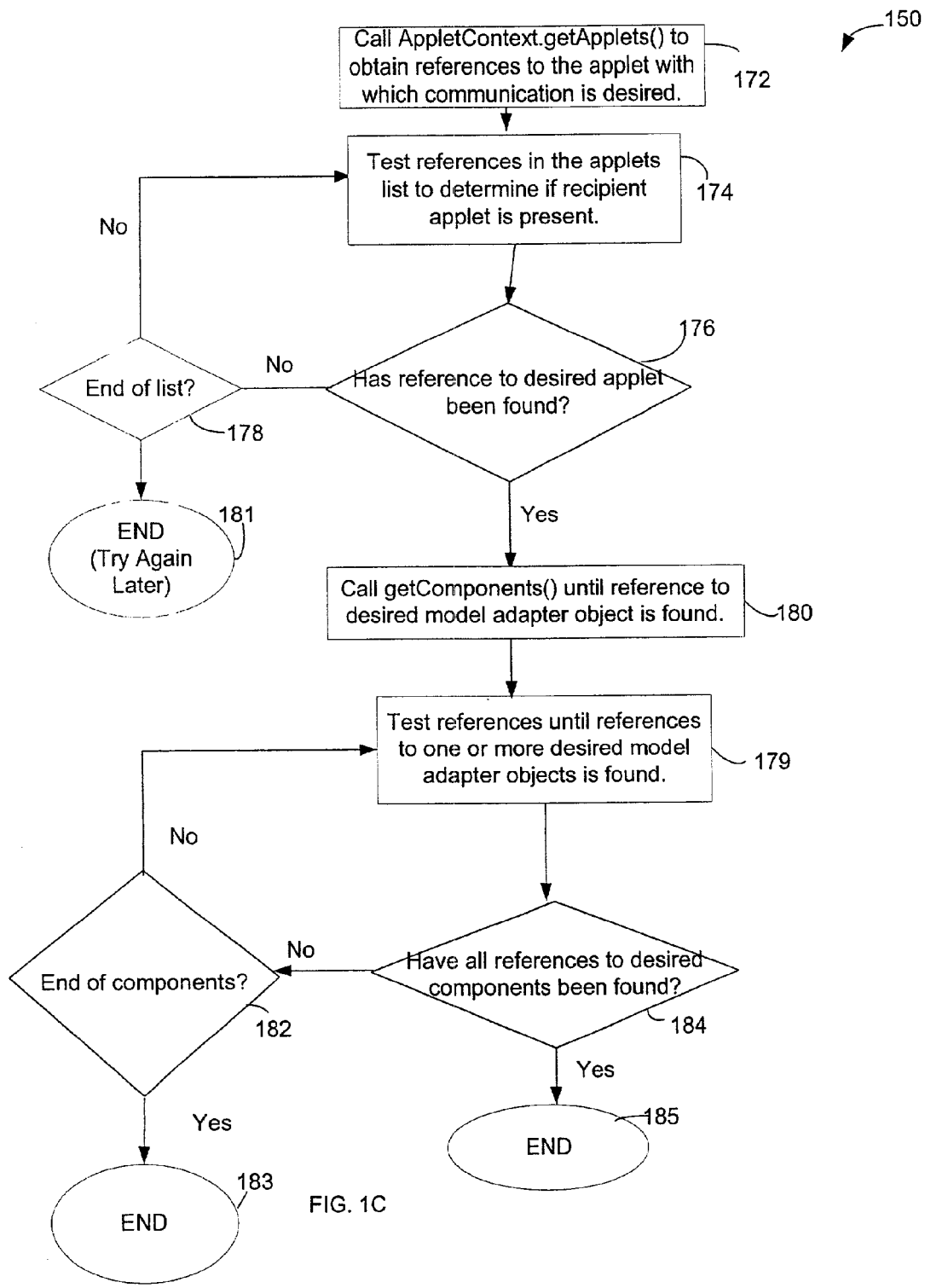
FIG. 1C illustrates an embodiment of a method of initialization for communication between unsigned applets in accordance with the present invention.

FIG. 1C illustrates an embodiment of an overall method 150 of initialization for communication between unsigned applets in accordance with the present invention.

An applet desiring to communicate with another applet in a shared environment calls 172 AppletContext.getApplets( ) to obtain a reference to the recipient applet with which it desires to communicate. For example, in the embodiment of FIG. 1B, initialization controller 160 of device applet 114 makes a getApplets( ) call 159 to the AppletContext object 164 which returns 161 a list of references to applets currently present including reference 163 to the fabric view applet 113.

An unsigned transmitting applet such as device applet 114 in FIG. 1B tests 174 the references in the list of applets to determine if the applet with which it desires to communicate is present. In the embodiment of FIG. 1B, the desired applet is the fabric view applet 113. Because the fabric view applet was loaded first, the reference to it will be found.

If a recipient applet has not been found 176, and all the references in the list 178 have been tested, the applet may try again later 181 at another time, for example after a polling interval, in order to obtain the reference in order to communicate.

If the reference to the recipient applet has been found, the applet then calls the getcomponents( ) 180 method of the container class with respect to the desired recipient applet to obtain a reference to the one or more model adapter objects. The returned references are each tested 179 until the reference to the desired one or more model adapter objects is found 184 or there are no more components 182.

In the embodiment of FIG. 1B, initialization controller 160 uses the reference 163 to the fabric view applet to call the container class method getcomponents for the fabric view applet to obtain a list of references to its components. Initialization controller 160 tests the references and finds the reference 167 to the event model adapter 168 which is also of the GUI class container in this embodiment.

Figure 2A:
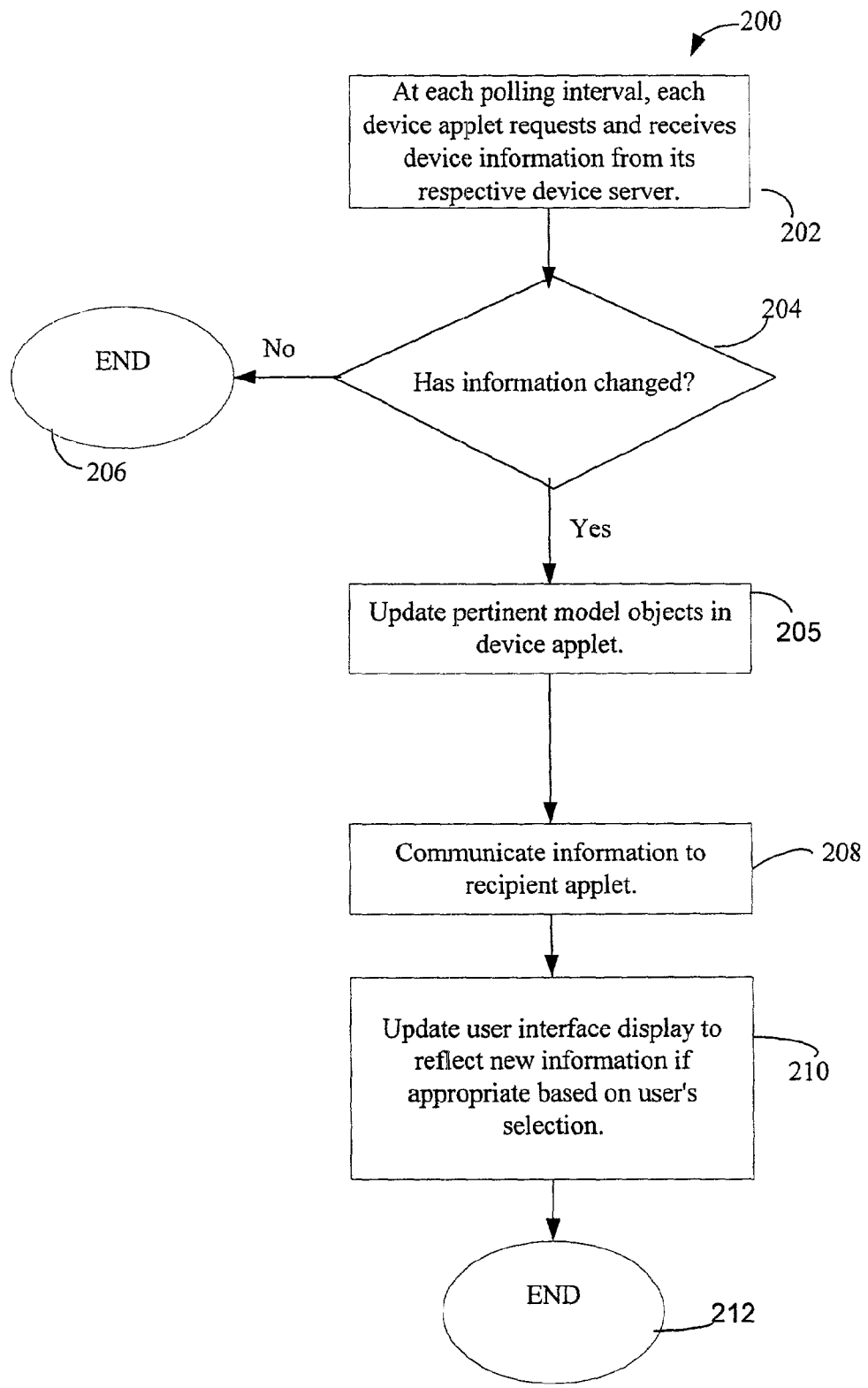
FIG. 2A illustrates an embodiment of an overall method of remotely managing a plurality of network devices using unsigned app lets in accordance with the present invention.

FIG. 2A illustrates an embodiment of an overall method 200 of remotely managing a plurality of network devices using unsigned applets in accordance with the present invention. Each device applet polls its own device. The timing of the polling is configurable. In one example, the polling interval is set to every 5 seconds. At each polling interval, device information is requested and received 202 from the respective device server. If the information has not changed 204, then the device applet does no further processing 206 with respect to the incoming device data. If the information has changed 204, the model objects effected by the data change, the pertinent model objects, in the device applet are updated 205. The information is communicated 208 to a recipient applet that uses that information such as the fabric view applet 113. The user interface is then updated 210 to reflect the new information on the display if appropriate based on the user's selection.

Figure 2B:
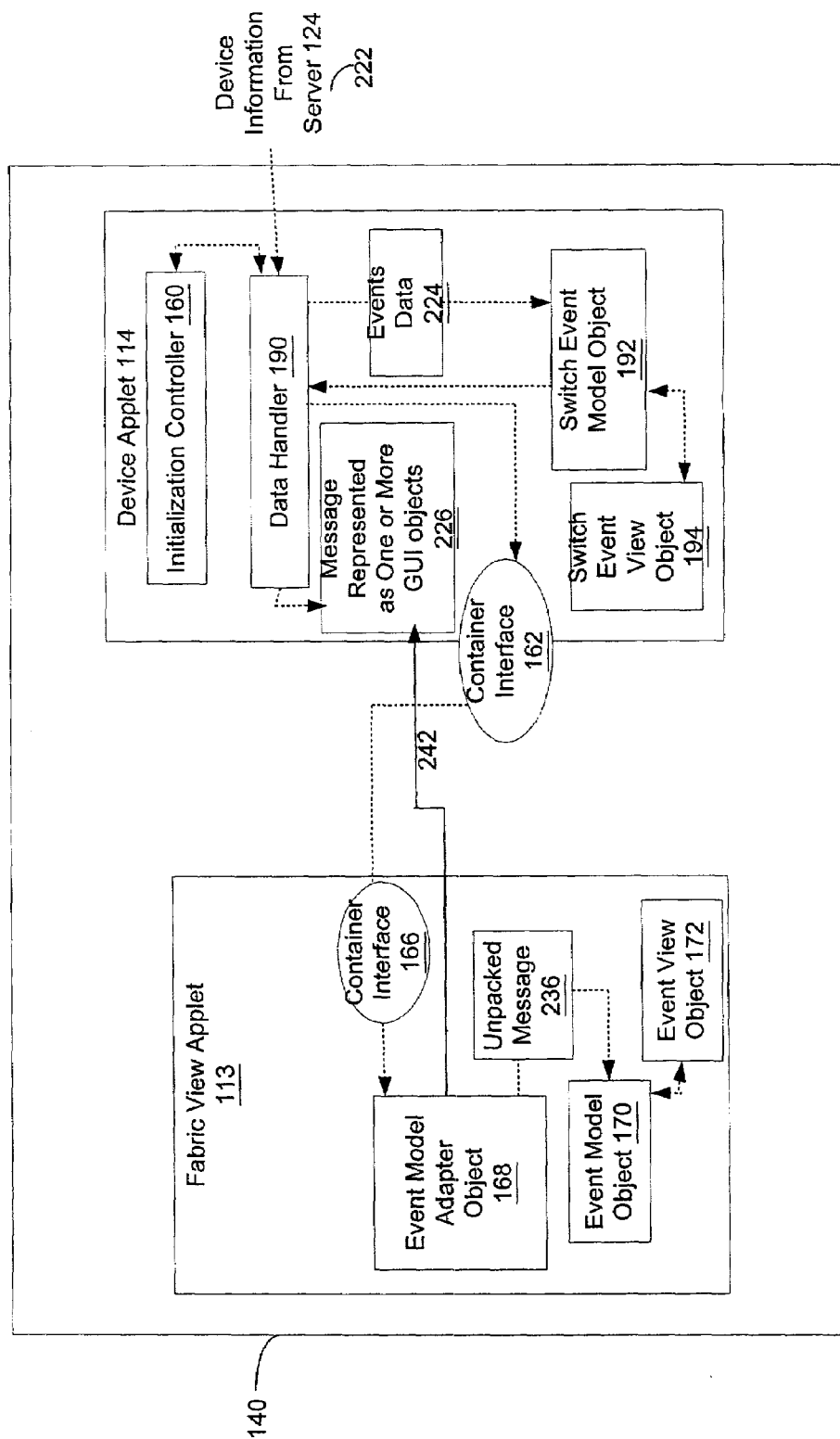
FIG. 2B illustrates an embodiment of an apparatus for communication between unsigned applets launched from different devices in accordance with the present invention.

FIG. 2B illustrates an embodiment of an apparatus for communication between unsigned applets launched from different devices in accordance with the present invention. In the shared environment of a webpage 140, device applet 114 launched from device server 124 on switching device 2 communicates with fabric view applet 113 which was launched from server 122 on switching device 1. Device applet 114 comprises a data handler 190 which is a sink object for the device information from the corresponding device server 124, a model object which in this embodiment is switch event model object 192 which is of a non-GUI class and a switch event view object 194.

As in FIG. 1B, fabric view applet 113 comprises a model adapter object shown here as event model adapter object 168, a non-GUI class model object shown here as event model object 170, and event view object 172.

In this embodiment, the device applet requests device information from its switch. Included in the device information is a HTML page of event information.

This event information is parsed by the data handler into a standard Java class called properties which comprises name-value pairs with the methods to access them. The values in the properties class are put into an object of the standard class called arraylist. The arraylist is a dynamic array. Each arraylist object represents one row in a table in the switch event model object. Each row is added to this table which is also of the class arraylist and that contains all the rows.

Information for each event may include a row for each event in which the columns in the switch event model table include the following: Machine Name, Event Number, Event Timestamp, Event Count, Event Level, Event Message, and WWN (Worldwide Name). The rows are then sent to the switch event model object which determines whether or not the sent rows represent a different set from its current set of rows. If the new set does not represent new information, then processing ends. If it does then the switch event model object notifies the data handler 190 of this.

Figure 2C:
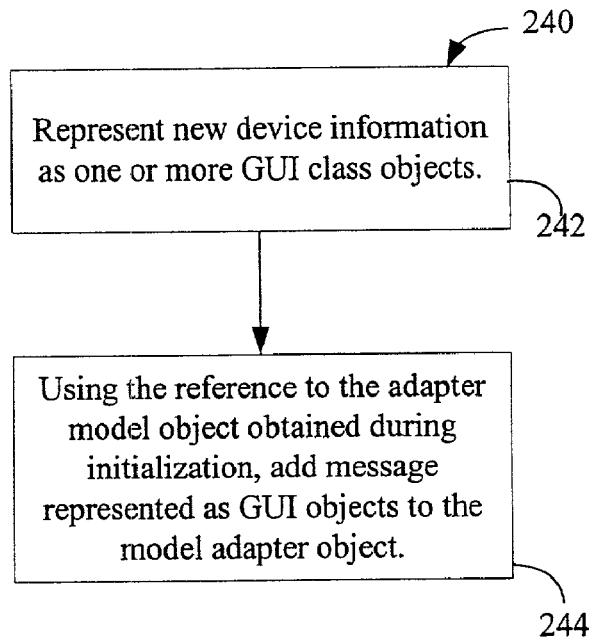
FIG. 2C illustrates an embodiment of a method of communication between unsigned app lets launched from different devices from the perspective of the transmitting applet sending information in accordance with the present invention.

FIG. 2C illustrates an embodiment of a method of communication between unsigned applets launched from different devices from the perspective of the transmitting applet which sends information in accordance with the present invention. As discussed with respect to FIG. 2B, once new information arrives, and the device applet has stored the new data for the device, the information is desired to be communicated 208 to the fabric view applet.

The data handler 190 represents the list of rows of new information as one or more GUI class objects. For example in the embodiment of FIG. 2B, the events in the switch event model table are formatted into a message 226 by the data handler as a single container class object. The container has a container at index 0 that represents some information about the message. Following that container is one container for each row in order. Each container has a component for each column in that row. Using the reference to the event model adapter object, which is of the class container in this embodiment, previously obtained during initialization, the data handler 190 provides access to the message container object 226 by calling 244 a method add(components) of the container class, the call parameters including a reference 242 to the message 226. The add(components) method has been extended by the event model adapter object 168 of the fabric view applet.

Figure 2D:
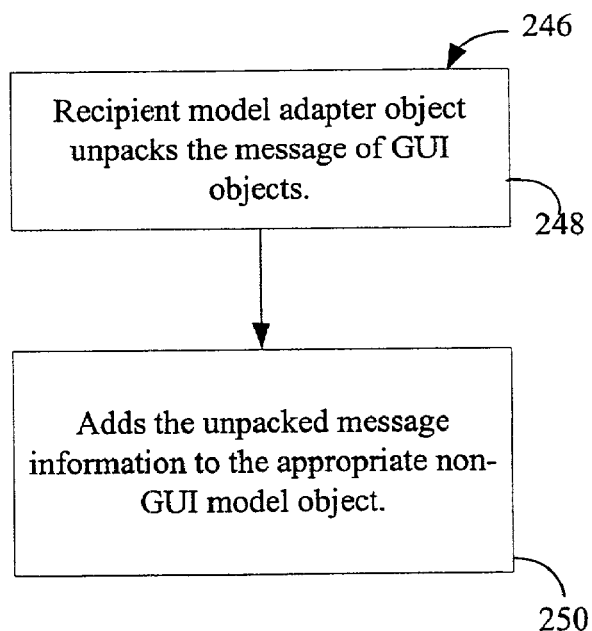
FIG. 2D illustrates an embodiment of a method of communication between unsigned applets launched from different devices from the perspective of the recipient applet receiving information in accordance with the present invention.

FIG. 2D illustrates an embodiment of a method 246 of communication between unsigned applets launched from different devices from the perspective of the applet receiving information in accordance with the present invention.

In the embodiment of FIG. 2D, the recipient model adapter object unpacks 248 the message represented as GUI class objects. The recipient model adapter object then adds 250 the unpacked message information to the appropriate non-GUI model object.

In the embodiment of FIG. 2B, the event model adapter object 168 unpacks the event data represented in the message container object 226. The method add (components) of the container class is overloaded to extract the message from the container object rather than the normal process of adding the container for display as part of the graphical user interface.

For example, the event model adapter object 168 uses standard methods available to the standard container class to retrieve the data. For example, the switch name can be retrieved using standard methods to extract text strings from GUI objects. In this embodiment, the retrieved data is put in the format of an arraylist table that the event model object can process. The event model object will then determine that new data has arrived. When a new set of rows comes in for a particular switch, the event model object will replace all the rows with a particular value in a certain column with the new rows. In this embodiment, the certain column used is the machine name column, and the particular value is the switch name.

In this way, the applets communicate within the same shared environment without violating the Java applet security model for applets launched from different devices.

In the embodiment of FIG. 2B, if the switching device graphical representation is to be updated, one or more view objects in the device applet will update the display. For example, switch event view object 194 will update a display of the switch's event information. If the user is looking at an interface to manage the entire fabric, one or more view objects in the fabric view applet will update the display. For example, event view object 172 would update a display of events for a plurality of switches in the fabric.

Figures 3, 4:
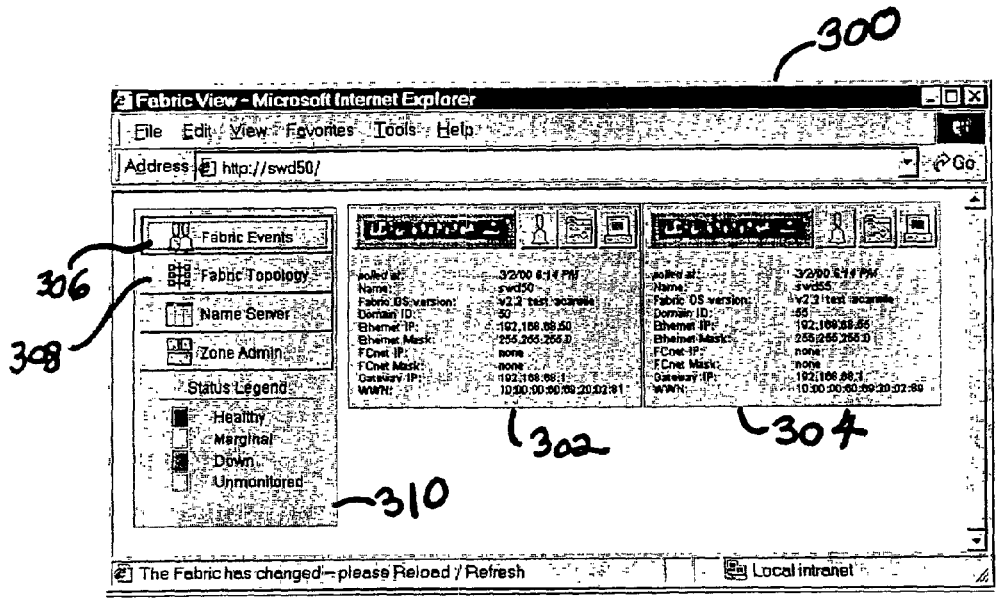
FIG. 3 illustrates an example of a single user interface as a shared environment in which each switch is graphically represented by its own applet in accordance with the present invention.
FIG. 4 illustrates an example of a user interface displaying device information for a plurality of network devices in accordance with the present invention.

FIG. 3 illustrates an example of a single user interface 300 as a shared environment in which information for each switch is graphically represented by its own applet. Switch 50 is graphically represented and dynamically updated in a window in a portion of the display 302 by its device applet.

The fabric view applet draws the window 310 that comprises items that a user may select to obtain fabric view information. For example, a user may click on the "Fabric Events" button and a window is presented to the user as shown in FIG. 4.

FIG. 4 illustrates an example of a user interface showing device information for a plurality of switching devices in a network. The data has been obtained by the fabric view applet querying the device applet for each switch. In this embodiment, the Fabric Events View 400 represents the union of all the switches' events, and is updated immediately after the switch events are polled. Fabric events do not exist on the switch itself. The information shown includes a name of the switch 402, the event number 404 for the affected switch, the time of the event 406, a number 408 of back-to-back occurrences of the same event, a security level 410 of the event, and a message 412 providing a description of the event.

Figure 5:
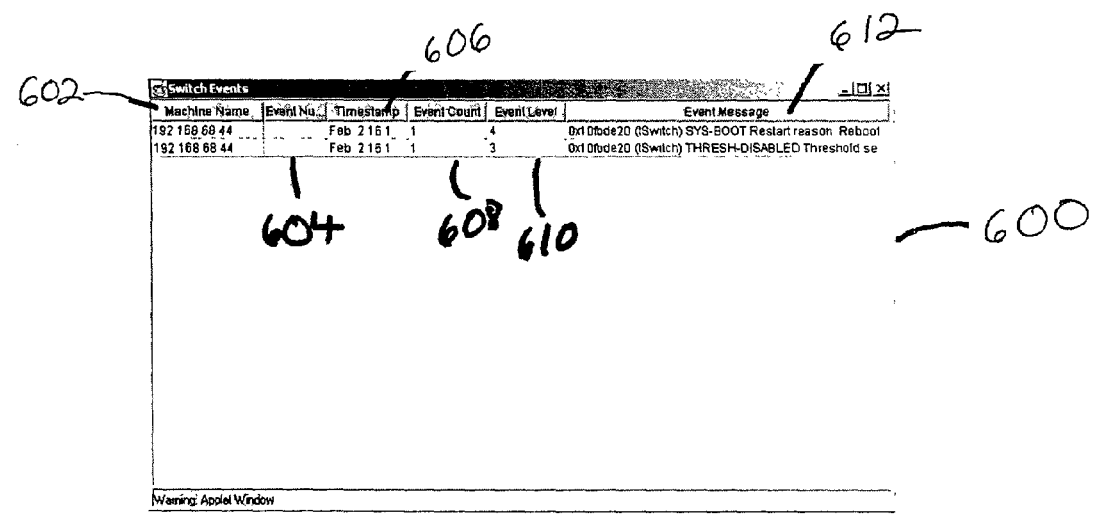

FIG. 5 illustrates an example of a user interface showing device information for a switching device. The Switch Events View 600 provides a running log of events for a switch. In this embodiment, the view is accessed by clicking the bell icon 312 on the respective switch's box in the Fabric Events View. The Switch Events View displays a machine name 602, an event number 604, a timestamp 606 of the time of the event, a number 608 of back-to-back occurrences of the same event, a security level 610 of the event, and a message 612 providing a description of the event.

The device applet for the switch communicates directly with the switch so that the applet obtains and displays more complete information directly from the switch it is managing. The ability to obtain information directly from the switch as opposed to the launch switch querying the switch through the network saves processing time and bandwidth within the network. Furthermore, when new features get added to a device, the applet for the device need only be updated. The launch device does not have to be concerned with interfacing with the new features of the switch. Each device need not provide the union of all functionality available for all the devices, even if the functionality is not available on that particular device.

The above description is included to illustrate the operation of one or more embodiments and is not meant to limit the scope of the invention. The scope of the invention is to be limited only by the following claims. From the above discussion, many variations will be apparent to those skilled in the art that would yet be encompassed by the spirit and scope of the invention.

What is claimed is:

1. In a system for remotely managing a plurality of network devices wherein each device is managed with a respective unsigned device applet launched from its device, an apparatus comprising a plurality of unsigned applets, including a device applet, operating within a same shared environment, the plurality of unsigned applets comprising:

a recipient applet comprising a model object of a non-graphical user interface class and a model adapter object of a graphical user interface class, the model adapter object being for unpacking information represented as one or more graphical user interface objects into a form usable by the model object;

a transmitting applet comprising an initialization controller for obtaining a reference to the recipient applet and for obtaining a reference to the model adapter object, and a data handler comprising access to the reference to the model adapter object, the data handler representing information as one or more graphical user interface class objects and providing access to the one or more graphical user interface class objects to the model adapter object using the reference to the model adapter object; and the transmitting applet and the recipient applet being launched from different devices and being communicatively coupled within the shared environment.

2. The apparatus of claim 1 wherein the shared environment is a webpage.

3. The apparatus of claim 1 wherein the transmitting applet is a device applet, and the recipient applet is a central management applet.

4. The apparatus of claim 1 wherein the model adapter object is of the container class.

5. The apparatus of claim 4 wherein the model adapter object comprises an overloaded method for extracting the information in the graphical user interface object.

6. A computer usable medium comprising a device management system that causes generation of a plurality of unsigned applets, including a device applet, being launched from different devices and being communicatively coupled within a shared environment wherein each device is managed with its own device applet launched from its device, the device management system comprising:

a recipient applet comprising a model object of a non-graphical user interface class and a model adapter object of a graphical user interface class, the model adapter object being for unpacking information represented as one or more graphical user interface objects into a form usable by the model object; and a transmitting applet comprising an initialization controller for obtaining a reference to the recipient applet and for obtaining a reference to the model adapter object, and a data handler comprising access to the reference to the model adapter object, the data handler representing information as one or more graphical user interface class objects and providing access to the one or more graphical user interface class objects to the model adapter object using the reference to the model adapter object.

\* \* \* \* \*